(No Model.)
M. P. HENDERSON.
SPRING VEHICLE.
No. 330,025. Patented Nov. 10, 1885.
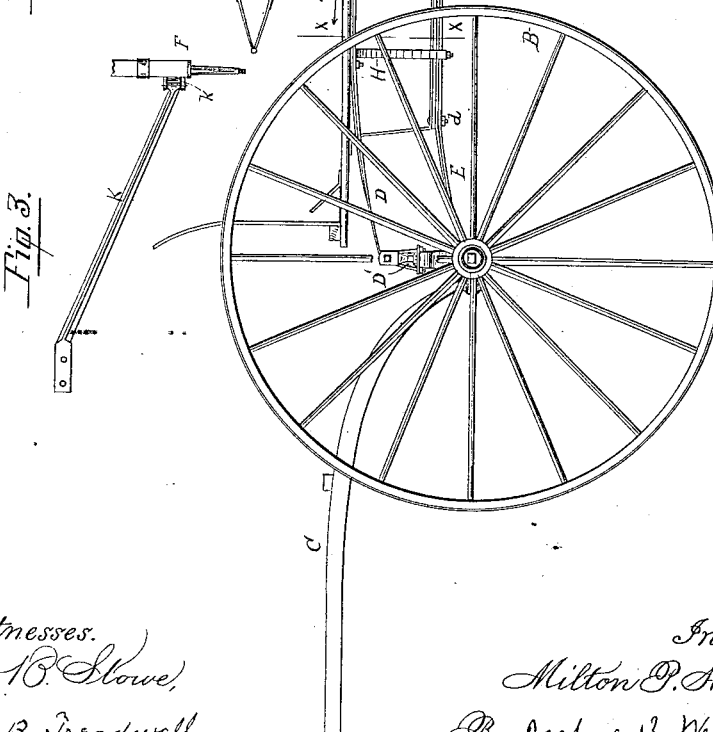
Witnesses.
Elihu B. Stowe
Alfred B. Treadwell
Inventor.
Milton P. Henderson
By Joshua B. Webster, Atty.

UNITED STATES PATENT OFFICE.

MILTON P. HENDERSON, OF STOCKTON, CALIFORNIA.

SPRING-VEHICLE.

SPECIFICATION forming part of Letters Patent No. 330,025, dated November 10, 1885.

Application filed July 31, 1885. Serial No. 173,124. (No model.)

*To all whom it may concern:*

Be it known that I, MILTON P. HENDERSON, a citizen of the United States, residing at Stockton, in the county of San Joaquin and State of California, have invented certain new and useful Improvements in Vehicles, of which the following is a specification, reference being had therein to the accompanying drawings and to the letters and figures of reference marked thereon, which form a part of this specification.

Figure 1 is a side elevation of my improved four-wheel vehicle. Fig. 2 is a section through line X X of Fig. 1, showing front, center, and side springs, braces, axle and bolster, and bottom of body. Fig. 3 is a detached view of one of hind spring-braces and portion of hind axle.

Similar letters of reference indicate corresponding parts.

The object of my invention is to provide a four-wheel vehicle that shall be strong and durable, and at the same time an easy-riding vehicle.

A is the body; B, the wheels; C, the shafts; D, the side springs, the front ones of which are secured to the bolster D' and to the bottom of the body A, and the rear ones of which are secured to the bottom of the body A and to the hind axle, F. G is the front axle. At the center of the bottom of the vehicle, just forward of the seat and between the two front side springs, I attach a ∪-shaped brace, I, and at right angles to it a similar brace, H, the bottom of the brace H being beneath that of brace I. Similarly situated just behind the seat are a similar set of braces, I' and H', shorter than those last described, so as to bear the same relation to the hind wheels that braces H and I do to the front wheels, so as to insure uniformity of motion to the spring and brace attachments, which I will now describe, viz: A brace, J, connects the two sets of braces I have just described, being located at its respective ends just beneath the bottom of braces I and I'. A spring, E', has its front end located underneath the rear end of brace J and between it and bottom of brace H', and has its rear end secured to rear axle, F. A similar front spring, E, is secured similarly in relation to front end of brace J and brace H and the front axle, G. Bolts *d* fasten the bottom of braces I and the front ends of braces J and spring E together, and a clip, *h*, secures them all to brace H. Similar bolts and clip secure the rear series of braces and springs together.

To secure the above entire arrangement of springs and braces from breaking from undue strain over rough roads, I provide rear side spring-braces, K, the front ends of which are secured, respectively, to blocks K', attached beneath the body A just in the rear of the seat, and the other ends are attached by clips around the rear axle, F, such rear ends being provided with jaws holding each a rubber block, *k*, to act as a preventative against jolting.

It will readily be seen that the attachment above described of the vehicle-body A to the axles and bolster is very strong and durable, and furnishes a very easy-riding vehicle.

Having thus described my invention, what I claim as new, and desire to secure by Letters Patent, is—

1. The vehicle-body A, secured to the front bolster, D', and to the front axle, G, by the side springs, D, and the center spring, E, and to the hind axle, F, by the side springs, D, and center spring, E', the center springs E and E' being attached, respectively, to front braces, H I, and rear braces, H' I', said braces being attached to bottom of body A and being connected together by brace J, all substantially as described and set forth.

2. The combination, with bottom of body A, of blocks K', and with hind axle, F, of the side rear spring-braces, K, the front ends attached to blocks K' and the rear ends to axle F, and having rubber blocks *k* at their connections with axle F, as and for the purposes set forth.

3. The combination, with the body A, having the depending braces H I at the front end thereof, of the spring E, attached at its forward end to the axle G and at its rear end to the braces H I, and the brace J, connected to the braces H I at its front end, and also attached to braces at its rear end, substantially as set forth.

4. The combination, with the body A and the braces H I, depending therefrom, of the spring E, connected to the braces H I at its rear end and to the axle G at its front end.

5. The combination, with the body A, having the depending braces at its rear end, of a spring, E', connecting said braces and the rear axle, substantially as described.

6. In a four-wheel vehicle, the combination of the series of bottom braces, H I and H' I', connected together by brace J and connected to axles G and F, respectively, by springs E and E', the front and rear series of such springs and braces being respectively secured together by bolts $d$ and clip $h$, as shown, substantially as and for the purposes set forth.

7. The combination, substantially as described, of the body A, the braces H I, the front side springs, D, the front center spring, E, the bolster D', and the front axle, G.

8. The combination, substantially as described, of the body A, the braces H' I', the rear side springs, D, the rear center spring, E', and hind axle, F.

9. The combination, substantially as described, of the bottom of body A, the blocks K', the rear side spring-braces, K, the rubber blocks, $k$, and the rear axle, F.

10. The combination, substantially as described, of the body A, the front braces, H I, the rear braces, H' I', and the connecting-brace J.

In testimony whereof I affix my signature in presence of two witnesses.

MILTON P. HENDERSON.

Witnesses:
ORRIN S. HENDERSON,
ELIHU B. STOWE.